United States Patent
Iga et al.

[11] Patent Number: 6,003,337
[45] Date of Patent: *Dec. 21, 1999

[54] METHOD AND APPARATUS FOR PRODUCING A SHEET GLASS

[75] Inventors: Motoichi Iga; Toru Kamihori; Atsushi Inoue; Yasuji Fukasawa, all of Yokohama, Japan

[73] Assignee: Asahi Glass Company Ltd., Tokyo, Japan

[*] Notice: This patent is subject to a terminal disclaimer.

[21] Appl. No.: 08/997,730

[22] Filed: Dec. 24, 1997

[30] Foreign Application Priority Data

Dec. 26, 1996 [JP] Japan ................................ 8-356819

[51] Int. Cl.$^6$ ............................ C03B 13/00; C03B 18/02; C03B 18/00
[52] U.S. Cl. ............................ 65/99.5; 65/99.1; 65/99.2; 65/182.4
[58] Field of Search .................................. 65/99.5, 99.6, 65/99.1, 99.2, 182.3, 182.4

[56] References Cited

U.S. PATENT DOCUMENTS

| | | | |
|---|---|---|---|
| 3,317,302 | 5/1967 | Mission | 65/99.6 |
| 3,459,523 | 8/1969 | Atkeson . | |
| 3,496,736 | 2/1970 | Hurwitz et al. | 65/99.6 |
| 3,718,450 | 2/1973 | Ohsato et al. . | |
| 4,012,216 | 3/1977 | Marchand | 65/99.6 |
| 4,081,260 | 3/1978 | Glikman et al. | 65/99.2 |
| 4,784,680 | 11/1988 | Sato et al. | 65/99.6 |
| 4,940,479 | 7/1990 | Sato et al. | 65/99.5 |
| 5,948,133 | 9/1999 | Iga et al. | 65/99.2 |

FOREIGN PATENT DOCUMENTS

| | | |
|---|---|---|
| 0 792 842 | 9/1997 | European Pat. Off. . |
| 2 050 697 | 6/1971 | Germany . |

OTHER PUBLICATIONS

U.S. application No. 08/806,656, filed Feb. 26, 1997, pending.

*Primary Examiner*—Stanley S. Silverman
*Assistant Examiner*—Jacqueline A. Ruller
*Attorney, Agent, or Firm*—Oblon, Spivak, McClelland, Maier & Neustadt, P.C.

[57] ABSTRACT

A method and apparatus for producing a sheet glass includes pouring a molten glass into a bathtub containing a molten metal so that it will form a molten glass stream having a constant width in a high temperature zone on the molten metal bath. The molten glass stream in the form of a ribbon having a desired thickness is led into a subsequent shaping zone, wherein, in the high temperature zone, the molten metal level in the vicinity of the edge of the molten glass stream is differentiated from the molten metal level at the center of the glass stream to complement a force of the molten glass stream for expanding or contracting in the width direction and thereby to maintain the edge at a predetermined position.

10 Claims, 2 Drawing Sheets

METHOD AND APPARATUS FOR PRODUCING A SHEET GLASS

The present invention relates to a method and an apparatus for producing a sheet glass by a float process.

Heretofore, production of a glass sheet by a float process has been carried out usually as follows.

A molten glass is continuously poured into a bathtub filled with a molten metal (such as tin). In a zone so-called a high temperature zone, the molten glass will have its width gradually broadened or narrowed until the width becomes constant, while it is permitted to flow along the advancing direction, and in a shaping zone subsequent to this high temperature zone, it will be adjusted to have a desired thickness and width as it advances, to form a strip-shaped glass ribbon.

In the high temperature zone, the breadth of the molten glass stream in width is controlled usually by controlling members called restricter tiles, so that the molten glass stream in the high temperature zone advances stably and is smoothly led to the subsequent shaping zone.

However, at the edge portion of the molten glass which is in contact with the restricter tiles, the relative flow velocity becomes 0, and the flow rate at the edge portion of the molten glass will accordingly be small as compared with the flow rate at the center portion. Further, at the edge portion of the molten glass which is in contact with the restricter tiles, the convective heat tends to be small as compared with that at the center portion, whereby the temperature decreases, and the viscosity at the edge portion tends to be higher than that at the center portion, which is also a factor to make the flow rate small at the edge portion of the glass stream as compared with at the center portion thereof. Thus, the conventional process has had a drawback that to make the sheet thickness uniform in the width direction, the thickness deviation has to be remedied in the subsequent shaping step. Further, such a process tends to cause devitrification in the vicinity of the edge, which tends to lead to a decrease in the yield. There has been also a drawback that since the molten glass is in contact with restricter tiles, swaying of the molten glass stream in the width direction is likely to take place due to instability of the contact state or due to instability at the time when the molten glass leaves the restricter tiles.

Under these circumstances, it is an object of the present invention to overcome the above-described drawbacks and to provide a method and an apparatus for producing a glass sheet, whereby in the high temperature zone, the molten glass stream can be advanced while its width is gradually adjusted in a desired controlled state without requiring restricter tiles.

The present inventors have conducted an extensive study and as a result, have found it possible to accomplish the above object by the following method.

Namely, the present invention provides a method for producing a sheet glass, which comprises pouring a molten glass into a bathtub containing a molten metal so that it will form a molten glass stream having a constant width in a high temperature zone on the molten metal bath, and leading the molten glass stream in the form of a ribbon having a desired thickness in a subsequent shaping zone, wherein, in the high temperature zone, the molten metal level in the vicinity of the edge of the molten glass stream is differentiated from the molten metal level at the center of the glass stream to complement a force of the molten glass stream for expanding or contracting in the width direction and thereby to maintain the edge at a predetermined position.

Further, the present invention provides an apparatus for producing a sheet glass by a float process wherein a molten glass is poured to form a molten glass stream on a molten metal filled in a bathtub, and the molten glass stream is led to form a ribbon having a desired thickness, wherein a discharge/suction means for discharging or withdrawing the molten metal substantially in a vertical direction along a desired edge of the molten glass stream, is provided in a high temperature zone to let the molten glass stream have a constant width.

In the accompanying drawings:

in FIG. 1.

FIG. 4 is a horizontal cross-sectional view of an apparatus for producing a sheet glass employed in Example 2.

Now, the present invention will be described in detail with reference to the preferred embodiments.

As described above, the present invention is characterized in that the molten metal level in the vicinity of the edge of the molten glass stream in the high temperature zone, is differentiated from the molten metal level at the center, i.e. specifically, it is differentiated to be higher or lower than the level at the center, to complement a force of the molten glass stream for expanding outwardly or for contracting inwardly and thereby to maintain the edge of the molten glass stream at a predetermined position.

Figure 1:
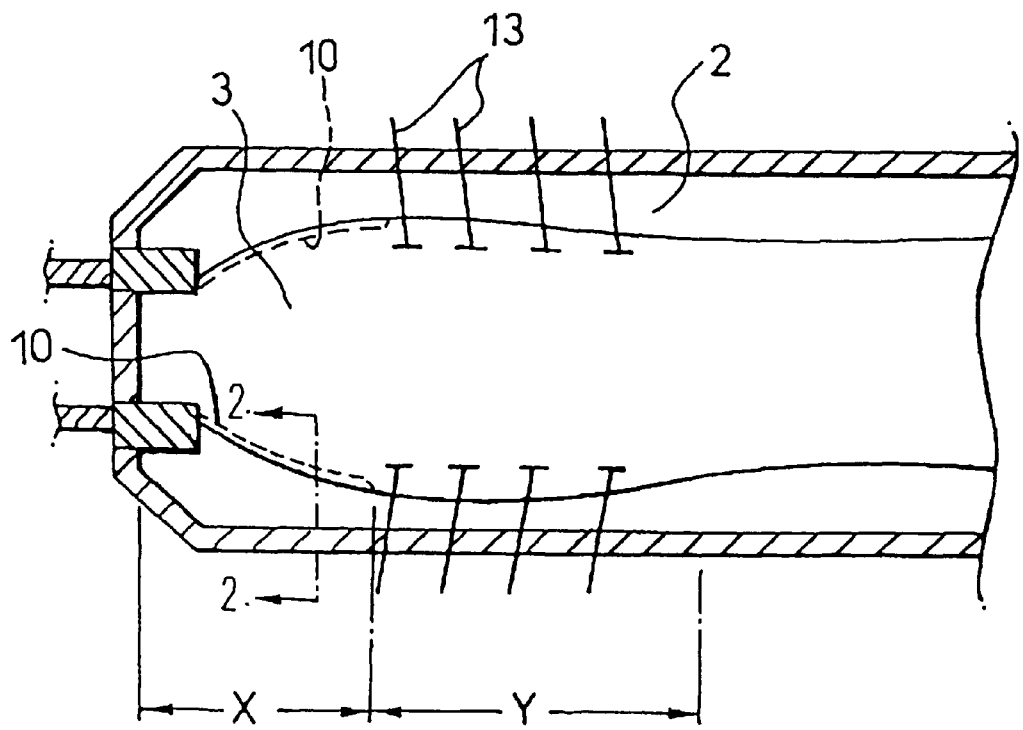
FIG. 1 is a horizontal cross-sectional view of an apparatus for producing a sheet glass according to the present invention.

FIG. 1 is a horizontal cross-sectional view of an apparatus for producing a sheet glass by a float process and shows an example wherein both edges of a molten glass stream in the high temperature zone are maintained at predetermined positions by the method of the present invention. Referring to this example, a case wherein a molten glass stream is about to expand in the width direction in a high temperature zone X (with a soda lime silica glass, it is usually from 1,100 to 930° C.), and a case wherein the molten glass stream is about to contract, will be described.

Figure 2:
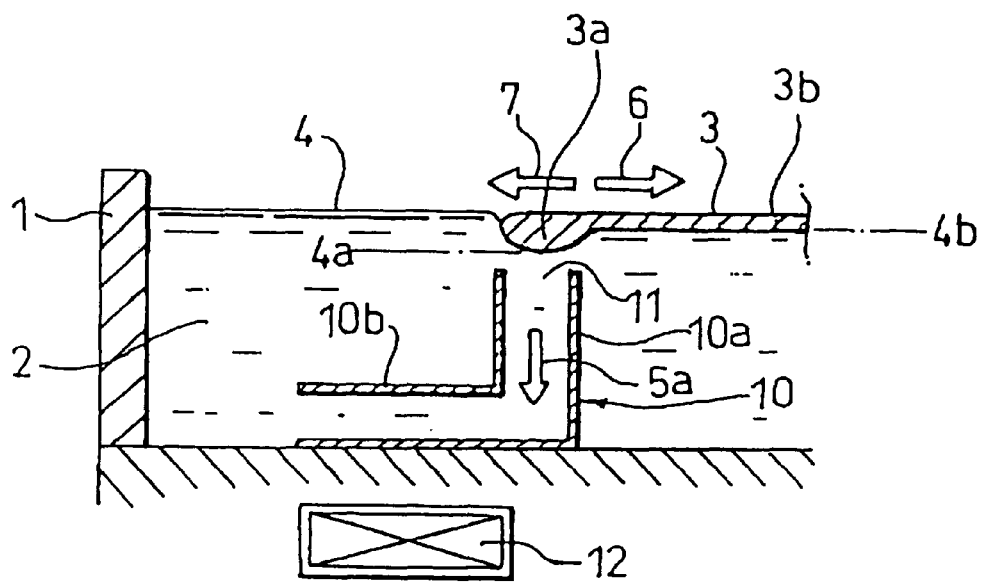
FIG. 2 is a cross-sectional view taken along line 2.—2.

(1) A Case wherein the Molten Glass Stream is about to Contract in the Width Direction FIG. 2 is a cross-sectional view taken along line 2.—2. in FIG. 1, i.e. a partial cross-sectional view in the width direction of the molten glass stream 3 flowing on a molten metal bath 2 filled in a molten metal bathtub 1. In FIG. 2, when a current 5a of the molten metal which is directed to the bottom of the bathtub in a direction substantially perpendicular to the bath surface 4, is created in the molten metal bath 2, a negative pressure will be formed at the lower side of the molten glass stream at the edge portion 3a. By this negative pressure, the molten metal level 4 at the edge portion 3a will be made slightly lower than the molten metal level 4b at the center portion, thereby to form a recess. To the recess i.e. the lower portion, the molten glass flows in, so that the thickness of the edge portion 3a becomes thicker than the center portion 3b. This thickness deviation creates an attracting force (arrow 7), which complements a force (arrow 6) of the molten glass stream for contracting in the width direction by its surface tension. As a result, the edge of the molten stream is maintained at this position.

Thus, the control to lower the molten metal level in the vicinity of the edge of the molten glass stream than at the center portion, will be required, for example, in a case where a glass thinner than the equilibrium thickness is to be produced, or in a case where the amount of the molten glass which is withdrawn, is large, and the contracting force in the width direction of the molten glass stream is predominant.

Figure 3:
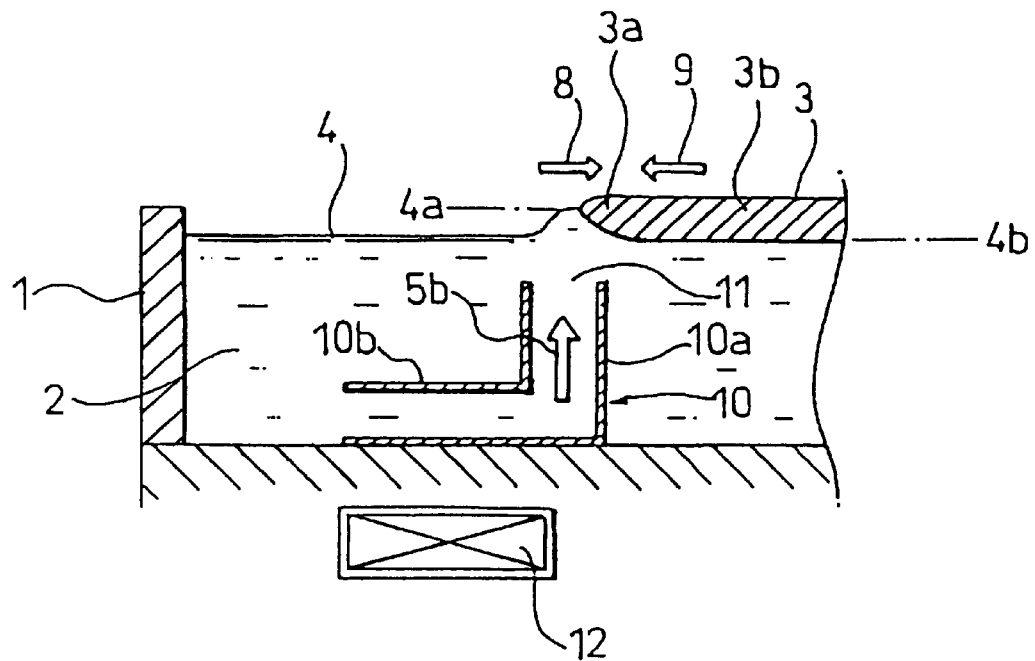
FIG. 3 is another cross-sectional view taken along line 3.—3.

(2) A case wherein the Molten Glass Stream is about to Expand in the Width Direction Like FIG. 2, FIG. 3 is a cross-sectional view taken along line 3.—3. in FIG. 1, but the flow direction of the molten metal is opposite to the direction in FIG. 2. Namely, in FIG. 3, when a current 5b of the molten metal directed in a direction substantially perpendicular to the molten metal bath surface 4, is created in the molten metal bath 2, a positive pressure will be formed at the lower side of the edge portion 3a.

By this positive pressure, the molten metal level 4a at the edge portion 3a will be made slightly higher than the molten metal level 4b at the center portion, thereby to form a bulge. From the bulge i.e. the higher portion, the molten glass flows out, so that the thickness at the edge portion 3a will be thinner than the center portion 3b. This thickness deviation creates a pressure (arrow 8), which complements a force (arrow 9) of the molten glass stream for expanding in the width direction. As a result, the edge of the molten glass stream will be maintained at this position.

Thus, the control to make the molten metal level higher in the vicinity of the edge of the molten glass stream than that at the center portion, will be required, for example, in a case where a glass thicker than the equilibrium thickness is to be produced, or in a case where the amount of the molten glass which is withdrawn, is small, and the expanding force of the molten glass stream in the width direction is predominant.

The current 5a or 5b of the molten metal is formed, for example, by providing a flume (a conduit) extending downwardly in a vertical direction from directly below the edge portion 3a and passing the molten metal therethrough upwardly or downwardly by a suitable driving means. By adjusting the direction and the flow rate of the molten metal current passing through the flume, it is possible to control the height and the degree of the molten metal level in the vicinity of the edge and thereby to create a pressure 8 or an attracting force 7 sufficient to complement a force 9 or a force 6 of the molten glass stream for expanding or contracting in the width direction, respectively.

More specifically, such a current is formed by a flume 10 as shown in FIGS. 2 or 3. The material for the flume may be any material so long as it has no or little reactivity with the molten metal. For example, brick made of alumina, silimanite or clay, or carbon, may be mentioned. When a linear motor as described hereinafter, is used as the driving means to apply a magnetic field to the flume 10, the flume is required to be made of a non-magnetic material, and carbon or brick may suitably be used.

As a driving means to adjust the direction and the flow rate of the molten metal passing through the flume 10, an electric pump or a linear motor may, for example, be mentioned. A linear motor is preferred from such a viewpoint that the molten metal can be directly driven without contact, and control of the flow rate is easy. Here, the linear motor is one having a coil formed on a comb-like core, so that when a three phase alternating current voltage is applied to sequentially magnetize the coil and thereby to form a magnetic field moving in a constant direction, and it is practically used, for example, as a linear induction motor or an electromagnetic pump. For example, when an alternating current magnetic field of 75 gauss at 50 Hz is applied to the flume by means of a linear motor, it is possible to create about 4 mm of the level difference in the molten metal. In the present invention, the level difference in the molten metal may usually be within a range of from 1 to 10 mm, preferably from 1 to 8 mm with a view to saving the energy required for driving the molten metal such as tin. Further, the width of the portion where the level difference is created, is preferably from 5 to 100 mm.

In the present invention, it is further preferred to apply a static magnetic field in the vicinity of the edge 3a of the molten glass stream. By minimizing the flow of the molten metal in the vicinity of the edge, it is possible to stabilize the shape of the molten metal bath surface and thereby to maintain the edge more stably. The intensity of this magnetic field is usually at most 1,500 gauss, preferably at least 500 gauss.

In carrying out the method of the present invention, also in a shaping zone (zone Y in FIG. 1, which is from 900 to 800° C. in the case of soda lime silica glass), the edge of the strip-shaped glass stream can be maintained at a predetermined position by differentiating, i.e. increasing or lowering, the molten metal level in the vicinity of the edge of the strip-shaped glass stream from the molten metal level at the center portion of the glass stream to complement a force of the strip-shaped molten glass stream for expanding or contracting in the width direction.

In such an embodiment, the edge of the strip-shaped glass stream can be maintained at a predetermined position without using a top roll which used to be required in the shaping zone, whereby a sheet glass having desired thickness and width, can be obtained.

Now, the method for producing a sheet glass of the present invention will be described in detail with reference to Examples. However, it should be understood that the present invention is by no means restricted to such specific Examples.

EXAMPLE 1

In Example 1, production of a sheet glass was carried out by using an apparatus for producing a sheet glass as shown in FIGS. 1 to 3. More particularly, the material for the flume 10 is carbon. The opening 11 of the flume 10 is located substantially directly below the edge portion 3a of the molten glass stream at a distance of 10 mm from the bath surface level when no molten glass is introduced into the bathtub. In general, it is preferably located at a position of from 3 to 25 mm, preferably 5 to 25 mm, below the bath surface level. The width of the opening of the flume 10 is 25 mm. In general, this width is preferably within a range of from 3 to 50 mm, preferably from 10 to 50 mm. The vertical portion 10a of the flume 10 extends downwards and is bent at the bottom of the bathtub towards the edge of the bathtub to form a horizontal portion 10b which extends in a direction perpendicular to the advancing direction of the molten glass stream and is opened. The opening is disposed along the edge of the molten glass stream at a position where the discharge or withdrawal of the molten metal can smoothly be carried out.

Below the flume 10 and beneath the bottom of the bathtub, a linear motor 12 is disposed at a position where a driving force can be applied to the molten metal in the horizontal portion 10b of the flume 10. By the linear motor 12, the molten metal can be energized so that the molten metal in the flume 10 will flow from directly below the edge portion to the edge portion of the bathtub, or it will flow in the opposite direction.

In a case where a glass sheet thinner than the equilibrium thickness is to be produced, a current 5a of the molten metal is created so that the molten metal is withdrawn from the opening 11 of the vertical portion. Consequently, the molten metal level 4a at the edge portion 3a will be slightly lower than the molten metal level 4b at the center portion, whereby the thickness of the edge portion 3a will be thicker than the central portion. This deviation in thickness creates an attracting force in the width direction of the molten glass stream, whereby the edge of the molten glass stream will be maintained at a predetermined position.

Thereafter, the molten glass stream is sent to a shaping zone in a stabilized state, and after having its thickness and width adjusted by a top roll, it is cooled to a temperature at which the thickness will no longer change, whereupon it will be sent to a downstream annealing zone.

In a case where a glass sheet thicker than the equilibrium thickness is to be produced, a current 5b of the molten metal is created by the linear motor 12, so that the molten metal will flow out from the opening 11 of the vertical portion of the flume 10. Consequently, the molten metal level 4a at the edge portion 3a will be slightly higher than the molten metal level 4b at the center portion, whereby the thickness of the edge portion 3a will be thinner than the center portion. This deviation in thickness creates a pressure in the width direction of the molten glass stream, whereby the edge of the molten stream is maintained at a predetermined position.

Thereafter, the operation is the same as in the above-mentioned case for the production of a glass sheet thinner than the equilibrium thickness. In the shaping zone, the thickness and width of the sheet are adjusted by a usual top roll.

EXAMPLE 2

Figure 4:
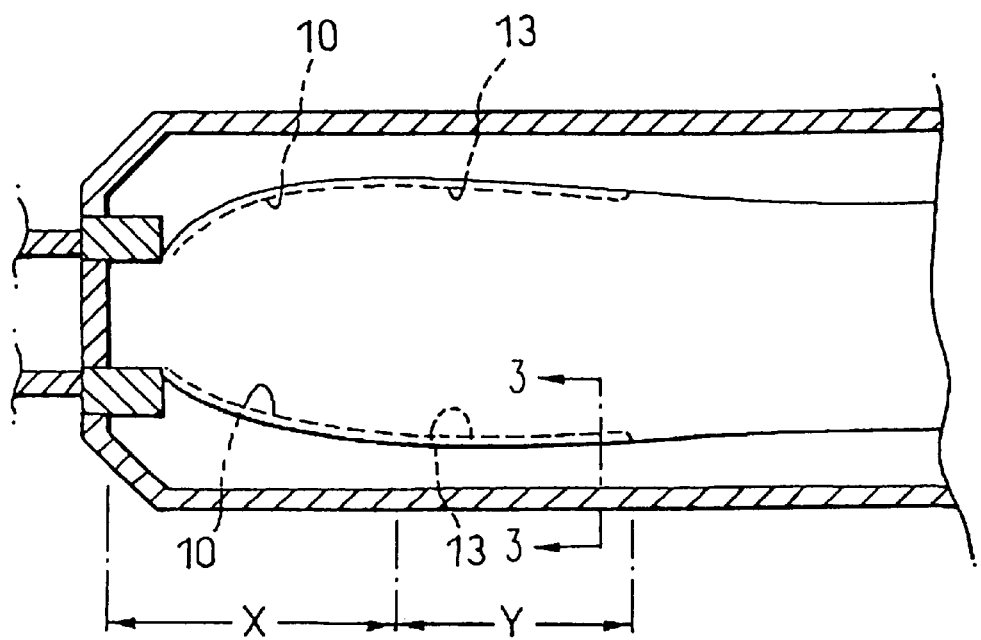
in FIG. 4.

FIG. 4 is a horizontal cross-sectional view of an apparatus for producing a sheet glass, and in a high temperature zone X, a flume 10 is provided in the molten metal layer directly below the edge portion of the molten glass stream in the same manner as in FIGS. 1 to 3, and further, a flume 13 constituting the passage of the molten metal in the vicinity of the edge portion, is provided also directly below the edge portion of the strip-shaped glass stream in the shaping zone Y. The structure of the flume 13 is the same as illustrated in FIGS. 2 and 3. The flume 13 and the flume 10 may be independent or may be integral.

In a case where a glass sheet thinner than the equilibrium thickness is to be produced, or in a case where the amount of the strip-shaped glass which is withdrawn, is large, the molten metal is withdrawn from the opening of the vertical portion of the flume 13, so that the molten metal level directly below the edge portion will be lower than the center portion. Inversely, in a case where a glass sheet thicker than the equilibrium thickness is to be produced, the molten metal is discharged from the opening so that the molten metal level directly below the edge portion will be higher than the center portion. By such control, a force of the strip-shaped glass stream for expanding or contracting in the width direction will be complemented, whereby the glass stream can be shaped to have a desired thickness.

Thereafter, the shaped molten glass stream is cooled to a temperature at which the thickness will no longer change, whereupon it is transferred to a downstream annealing zone.

According to the method and the apparatus for producing a sheet glass of the present invention, the molten glass stream can be led while maintaining the edge of the molten glass stream at a predetermined position by complementing a force of the molten glass stream for expanding or contracting in the width direction in the high temperature zone, whereby it will be unnecessary to install restricter tiles which used to be required. Consequently, it is possible to eliminate problems attributable to the restricter tiles, such as problems of swaying in the width direction of the glass ribbon, the deviation in thickness of the glass ribbon and devitrification. Further, it is also possible to shorten the distance from the glass supplying inlet to the shaping zone of the float bath.

Further, when the edge-maintaining method of the present invention is applied also to the shaping zone, it will be unnecessary to install a top roll. Consequently, it is possible to overcome problems attributable to the top roll, such as distortion (fine waving) or problems relating to waste and the operation efficiency of the top roll engaging portion.

These effects are particularly remarkable when the amount of glass which is withdrawn, is small.

What is claimed is:

1. A method for producing a sheet glass, which comprises pouring a molten glass into a bathtub containing a molten metal so that it will form a molten glass stream having a constant width in a high temperature zone on the molten metal;

leading the molten glass stream in the form of a ribbon having a desired thickness in a subsequent shaping zone;

directing a component of a current of molten metal in the high temperature zone, along at least one of a direction oriented perpendicularly towards a surface of the molten metal and a direction oriented perpendicularly away from the surface of the molten metal to compensate for a force of the molten glass stream for expanding or contracting in the width direction and to thereby maintain an edge of the molten glass stream at a predetermind position;

wherein when the component of the current molten metal is directed away from the surface, the component of the molten metal causes a level of the molten metal in a vicinity of the edge of the molten glass stream to be lower than a level of the molten metal in a vicinity of the central portion of the molten glass stream so as to compensate the force of the molten glass stream for contracting in the width direction; and wherein when the component of the molten metal is directed towards the surface, the component of the molten metal causes the level of the molten metal in the vicinity of the edge of the molten glass stream to be higher than the level of the molten metal in the vicinity of the central portion of the molten glass stream, so as to compensate the force of the molten glass stream for expanding in the width direction.

2. The method for producing a sheet glass according to claim 1, wherein the edge is maintained at a predetermined position by forming a recess or bulge on a surface of the molten metal in the vicinity of the edge of the molten glass stream.

3. The method for producing a sheet glass according to claim 1, wherein, in the shaping zone, the molten metal level in the vicinity of the edge of the molten glass stream is differentiated from the molten metal level at the center of the glass stream to complement a force of the molten glass stream for expanding or contracting in the width direction and thereby to maintain the edge at a predetermined position.

4. An apparatus for producing a sheet glass by a float process wherein a molten glass is poured to form a molten glass stream on a molten metal filled in a bathtub, and the molten glass stream is led to form a ribbon having a desired thickness, wherein a discharge/suction means for discharging or withdrawing the molten metal substantially in a vertical direction along a desired edge of the molten glass stream, is provided in a high temperature zone of the molten metal to provide the molten glass stream with a constant width.

5. The apparatus according to claim 4, wherein the discharge/suction means is provided also along a desired edge of the molten glass stream in a shaping zone of the molten metal subsequent to the high temperature zone.

6. A method for producing a sheet glass, which comprises pouring a molten glass into a bathtub containing a molten metal so that it will form a molten glass stream having a constant width in a high temperature zone on the molten metal;

leading the molten glass stream in the form of a ribbon having a desired thickness in a subsequent shaping zone;

directing a component of a current of molten metal perpendicularly towards a surface of the molten metal in the vicinity of the edge of the molten glass stream to thereby raise a level of the surface of the molten metal in the vicinity of the edge of the molten glass stream relative to a level of the molten metal at the center of the glass stream to complement a force of the molten glass stream for expanding in the width direction and thereby to maintain the edge at a predetermined position.

7. A method for producing a sheet glass, which comprises pouring a molten glass into a bathtub containing a molten metal so that it will form a molten glass stream having a constant width in a high temperature zone on the molten metal;

leading the molten glass stream in the form of a ribbon having a desired thickness in a subsequent shaping zone; and directing a component of a current of molten metal perpendicularly away from a surface of the molten metal in the vicinity of the edge of the molten glass stream to thereby lower a level of the surface of the molten metal in the vicinity of the edge of the molten glass stream relative to a level of the molten metal at the center of the glass stream to complement a force of the molten glass stream for contracting in the width direction and thereby to maintain the edge at a predetermined position.

8. A method according to claim 1, wherein said step of directing a component of a current of molten metal comprises directing a steady current of molten metal.

9. A method according to claim 6, wherein said step of directing a component of a current of molten metal perpendicularly towards a surface comprises directing a steady current of molten metal.

10. A method according to claim 7, wherein said step of directing a component of a current of molten metal perpendicularly away from a surface comprises directing a steady current of molten material.

* * * * *